(12) United States Patent
Hwang et al.

(10) Patent No.: US 8,818,792 B2
(45) Date of Patent: Aug. 26, 2014

(54) APPARATUS AND METHOD FOR CONSTRUCTING VERBAL PHRASE TRANSLATION PATTERN USING BILINGUAL PARALLEL CORPUS

(75) Inventors: Young Sook Hwang, Seoul (KR); Sang-Bum Kim, Seoul (KR); Chang Hao Yin, Seoul (KR); Hae Chang Rim, Seoul (KR); Joo Young Lee, Seoul (KR)

(73) Assignee: SK Planet Co., Ltd., Seoul (KR)

( * ) Notice: Subject to any disclaimer, the term of this patent is extended or adjusted under 35 U.S.C. 154(b) by 0 days.

(21) Appl. No.: 13/878,082

(22) PCT Filed: Jul. 8, 2011

(86) PCT No.: PCT/KR2011/005005
§ 371 (c)(1),
(2), (4) Date: Apr. 5, 2013

(87) PCT Pub. No.: WO2012/060534
PCT Pub. Date: May 10, 2012

(65) Prior Publication Data
US 2014/0012564 A1    Jan. 9, 2014

(30) Foreign Application Priority Data
Nov. 5, 2010   (KR) ................ 10-2010-0109542

(51) Int. Cl.
*G06F 17/28* (2006.01)

(52) U.S. Cl.
USPC ............... 704/4; 704/1; 704/2; 704/3; 704/5; 704/6; 704/7; 704/8; 704/9; 704/10; 704/277

(58) Field of Classification Search
CPC . G06F 17/2785; G06F 17/274; G06F 17/271; G06F 17/277; G06F 17/2755
USPC .......................................................... 704/9
See application file for complete search history.

(56) References Cited

U.S. PATENT DOCUMENTS 5,687,383 A * 11/1997 Nakayama et al. ............... 704/2
5,805,832 A *  9/1998 Brown et al. ..................... 711/1
(Continued)

FOREIGN PATENT DOCUMENTS

KR    10-2006-0067073       6/2006

OTHER PUBLICATIONS

A Conceptual Framework for Korean-English Machine Translation using Expression Patterns:, Ho Suk Lee, Journal of Korea Computer Congress, vol. 35, No. 1, pp. 236-241, Jul. 2, 2008.

(Continued)

*Primary Examiner* — Pierre-Louis Desir
*Assistant Examiner* — Fariba Sirjani
(74) *Attorney, Agent, or Firm* — Lowe Hauptman & Ham, LLP (57) ABSTRACT

An apparatus and a method for constructing a verb phrase translation pattern using a bilingual parallel corpus. Each of the apparatus or method recognizes a predicate and an argument using a syntax analysis result and a word alignment result of a source sentence from a plurality of bilingual parallel corpus, extracts a translation pattern candidate and an occurrence frequency using the recognized predicate and argument, and then generates a basic verb phrase translation pattern by verifying the translation pattern candidate, and generalizes the generated basic verb phrase translation pattern to generate a general verb phrase pattern so as to be applied to various language pairs and minimize an error in the verb phrase translation pattern and determine an appropriate generalization level using a co-occurrence frequency of a predicate and an argument of the verb phrase translation pattern and a translation probability of the predicate.

23 Claims, 5 Drawing Sheets

(56) References Cited

U.S. PATENT DOCUMENTS

| | | | |
|---|---|---|---|
| 6,289,302 B1 * | 9/2001 | Kuo | 704/2 |
| 6,330,530 B1 * | 12/2001 | Horiguchi et al. | 704/4 |
| 6,463,404 B1 * | 10/2002 | Appleby | 704/9 |
| 6,473,729 B1 * | 10/2002 | Gastaldo et al. | 704/4 |
| 6,651,039 B1 * | 11/2003 | Ikuta et al. | 704/4 |
| 6,745,161 B1 * | 6/2004 | Arnold et al. | 704/7 |
| 7,010,479 B2 * | 3/2006 | Murata et al. | 704/9 |
| 7,447,628 B2 * | 11/2008 | Ryu et al. | 704/10 |
| 7,475,005 B2 * | 1/2009 | Itoh et al. | 704/5 |
| 7,672,829 B2 * | 3/2010 | Ishikura | 704/2 |
| 7,788,083 B2 * | 8/2010 | Maxwell, III | 704/2 |
| 8,005,662 B2 * | 8/2011 | Miyahira et al. | 704/2 |
| 8,121,829 B2 * | 2/2012 | Hwang et al. | 704/4 |
| 8,185,377 B2 * | 5/2012 | Zhou | 704/9 |
| 8,219,382 B2 * | 7/2012 | Kim et al. | 704/2 |
| 8,311,799 B2 * | 11/2012 | Liu | 704/4 |
| 8,335,681 B2 * | 12/2012 | Yin et al. | 704/4 |
| 8,401,839 B2 * | 3/2013 | Kim et al. | 704/5 |
| 8,423,346 B2 * | 4/2013 | Seo et al. | 704/2 |
| 8,478,581 B2 * | 7/2013 | Chen | 704/9 |
| 8,543,376 B2 * | 9/2013 | Hwang et al. | 704/4 |
| 2003/0061023 A1 * | 3/2003 | Menezes et al. | 704/4 |
| 2004/0243394 A1 * | 12/2004 | Kitamura | 704/9 |
| 2004/0255281 A1 * | 12/2004 | Imamura et al. | 717/141 |
| 2005/0256698 A1 * | 11/2005 | Becks | 704/2 |
| 2006/0142995 A1 * | 6/2006 | Knight et al. | 704/9 |
| 2008/0086298 A1 * | 4/2008 | Anismovich et al. | 704/5 |
| 2008/0097742 A1 * | 4/2008 | Ushioda | 704/3 |
| 2008/0195375 A1 * | 8/2008 | Clifton et al. | 704/4 |
| 2009/0043564 A1 * | 2/2009 | Hwang et al. | 704/4 |
| 2009/0070099 A1 * | 3/2009 | Anisimovich et al. | 704/5 |
| 2010/0179803 A1 * | 7/2010 | Sawaf et al. | 704/2 |
| 2013/0117010 A1 * | 5/2013 | Hwang et al. | 704/2 |
| 2013/0158975 A1 * | 6/2013 | Hwang et al. | 704/2 |

OTHER PUBLICATIONS

"Design of Verb- Phrase Patterns for Korean-to-English MT", Seong-Il Yang et al., Journal of Annual Fall Conference of KIISE, vol. 28, No. 2, pp. 178-180, Oct. 20, 2001.

International Search Report mailed Feb. 10, 2012 for PCT/KR2011/005005.

* cited by examiner

APPARATUS AND METHOD FOR CONSTRUCTING VERBAL PHRASE TRANSLATION PATTERN USING BILINGUAL PARALLEL CORPUS

CROSS REFERENCE TO RELATED APPLICATION

This application claims the priority of Korea Patent Application No. 10-2010-0109542, filed on Nov. 5, 2010 in the KIPO (Korean Intellectual Property Office). Further, this application is the National Phase application of International Application No. PCT/KR2011/005005 filed Jul. 8, 2011, which designates the United States and was published in Korean.

TECHNICAL FIELD

The present disclosure relates to an apparatus and a method for constructing a verb phrase translation pattern using bilingual parallel corpus, and more particularly, to an apparatus and a method for constructing a verb phrase translation pattern using bilingual parallel corpus which recognizes a predicate and an argument using a syntax analysis result and a word alignment result of a source sentence from a plurality of bilingual parallel corpus, extracts a translation pattern candidate and an occurrence frequency using the recognized predicate and argument, and then generates a basic verb phrase translation pattern by verifying the translation pattern candidate, and generalizes the generated basic verb phrase translation pattern to generate a general verb phrase pattern so as to be applied to various language pairs and minimize an error in the verb phrase translation pattern and determine an appropriate generalization level using a co-occurrence frequency of a predicate and an argument of the verb phrase translation pattern and a translation probability of the predicate.

BACKGROUND ART

Machine translation refers to a job that converts a given sentence to be translated, that is, a source sentence into a translated sentence, that is, a target sentence using translation resources such as translating knowledge or rules and algorithms. A system that performs the machine translation job is referred to as a machine translating system. In many translation cases, a conjugatable word which corresponds to a predicative word in a sentence may be variously interpreted to have different meanings depending on surrounding contexts. For example, in case of an English word "prevent", the Korean translation may be varied depending on an object as follows. Here, the conjugatable word includes a verb exemplified in English and a verb and an adjective exemplified in Korean.

For example, an English sentence of "You cannot prevent their getting married." is translated into a Korean sentence of "당신은 그들이 결혼하는 것을 막을 수 없다." In contrast, in another example, an English sentence of "prevent flu from spreading" is translated into a Korean sentence of "유행성 감기의 만연을 예방하다."

In other words, "prevent" is usually used as a meaning of "stop" or "inhibit" but when a disease is used as an object, it is more natural to translate "prevent" to have a meaning of "avoid". As described above, since in many cases, the translation of the conjugatable word is varied depending on the surrounding contexts, it is easier to translate a sentence by combining a conjugatable word and the surrounding words as one pattern as compared with the translation of individual conjugatable words. Further, in case of English and Korean pair whose language families are different, since the locations of sentence components such as a subject, a predicative word, and an object are different, the information thereof are important factors in translation.

A verb phrase translation pattern is obtained by patterning translation information on a predicate and main arguments of a sentence such as "X prevent Y, X(가) Y(를) 막다" or "X prevent disease, X(가) 질병(을) 예방하다" and used as important information in machine translation.

A method of constructing a verb phrase pattern according to a related art uses a specific language pairs as a target. In the method of constructing a verb phrase pattern, a verb phrase pattern for a native language and a target language is constructed first, and then translated word is tagged thereto. Therefore, the language pair is limited and a verb phrase translation pattern may be automatically constructed.

More specifically, the method of constructing a verb phrase pattern according to a related art uses an English corpus, an English WordNet, and a translation dictionary for aligning words in addition to an English-Korean parallel corpus in order to construct a verb phrase pattern database for English-Korean translation. In other words, the method constructed an English verb phrase pattern database using English corpora in advance. The method tagged meaning information of an argument using a word net with respect to the argument of a verb phrase in a verb phrase pattern and aligned translated words of words configuring a sentence using bilingual parallel corpus and an electronic dictionary. And the method constructed the verb phrase translation pattern, while ambiguity in translated words of elements configuring the verbal phrase pattern is resolved using a sense vector and a Korean local context.

However, the related art has a limitation that only a Korean verb phrase translation pattern with respect to an English verb phrase is constructed. Further, in order to tag translation information for individual elements of the English verb phrase pattern, an English-Korean translation dictionary is required. Further, in order to resolve an ambiguity of translated words, a parallel corpus and an electronic dictionary are used to heuristically align words and corresponding Korean local contexts are used to configure a sense vector to resolve ambiguity of the translated word. However, the Korean translation pattern constructed above is incomplete.

DISCLOSURE

Technical Problem

Accordingly, the present disclosure has been made in an effort to provide an apparatus and a method for constructing a verb phrase translation pattern using a bilingual parallel corpus which recognizes a predicate and an argument using a syntax analysis result and a word alignment result of a source sentence from a plurality of bilingual parallel corpus, extracts a translation pattern candidate and an occurrence frequency using the recognized predicate and argument, and then generates a basic verb phrase translation pattern by verifying the translation pattern candidate, and generalizes the generated basic verb phrase translation pattern to generate a general verb phrase pattern so as to be applied to various language pairs and minimize an error in the verb phrase translation pattern and determine an appropriate generalization level using a co-occurrence frequency of a predicate and an argument of the verb phrase translation pattern and a translation probability of the predicate.

Technical Solution

In order to achieve the above object of the present disclosure, an apparatus according to a first aspect of the present disclosure includes: a predicate and argument recognizing unit that recognizes predicates and arguments of a source sentence and a target sentence using a syntax analysis result of the source sentence and a word alignment result between the source sentence and the target sentence from a plurality of bilingual parallel corpus; a translation pattern candidate extracting unit that extracts a translation pattern candidate including an original sentence pattern and a translated part pattern using the recognized predicates and arguments of the source sentence and the target sentence and confirms the corresponding occurrence frequency; a translation pattern candidate verifying unit that verifies the extracted translation pattern candidate using the occurrence frequency of the original sentence pattern or the translated part pattern for the extracted translation pattern candidate and generates a first verb phrase translation pattern according to the verification result; and a translation pattern generalizing unit that generalizes the generated first verb phrase translation patterns to generate a second verb phrase translation pattern.

Preferably, the apparatus further includes a translation pattern candidate storing unit that stores a translation pattern candidate extracted from the translation pattern candidate extracting unit; and a translation pattern storing unit that stores a translation pattern that stores the first verb phrase translation pattern generated in the translation pattern candidate verifying unit.

Preferably, the predicate and argument recognizing unit receives the plurality of bilingual parallel corpus to recognize the predicate and argument of the source sentence using the syntax analysis result of the source sentence and recognize the predicate and argument of the target sentence corresponding to the recognized predicate and argument of the source sentence using the word alignment result.

Preferably, the translation pattern candidate extracting unit extracts the same translation pattern candidate from different source sentence and target sentence and calculates the occurrence frequency of the extracted same translation pattern candidate.

Preferably, the translation pattern candidate verifying unit compares the occurrence frequency of the original sentence pattern for the extracted translation pattern candidate with a predetermined threshold and removes the corresponding translation pattern candidate when the occurrence frequency is lower than the threshold.

Preferably, if the occurrence frequency of the translated part pattern is lower than the predetermined threshold, the translation pattern candidate verifying unit removes the corresponding translation pattern candidate from a plurality of translation pattern candidates having the same original sentence pattern.

Preferably, if among the extracted same translation pattern candidates, a translation pattern candidate has the occurrence frequency of the translated part pattern which is lower than the predetermined threshold, the translation pattern candidate verifying unit verifies the extracted same translation pattern candidates depending on whether the arguments of the translation pattern is plural and another translated part pattern including the translated part pattern is present.

Preferably, when the arguments of the generated first verb phrase translation pattern are generalized to a syntax phrase label, the translation pattern generalizing unit verifies whether the first verb phrase translation pattern is an effective verb phrase translation pattern and generalizes the first verb phrase translation pattern to generate the second verb phrase translation pattern.

Preferably, the translation pattern generalizing unit makes a group of patterns having the same predicate of the original sentence pattern among the first verb phrase translation patterns and generates a second verb phrase translation pattern for all patterns that belong to the same group using tuples and the frequencies of the extracted tuples.

Preferably, the translation pattern generalizing unit generalizes arguments other than an argument corresponding to a tuple having the highest frequency among the frequencies of the extracted tuples to generate the second verb phrase translation pattern.

Preferably, the translation pattern generalizing unit analyzes the translation ambiguity for the generated second verb phrase translation pattern to determine the second verb phrase translation pattern.

Preferably, the translation pattern generalizing unit repeatedly generalizes the translation pattern in the translation pattern generalizing unit for the determined second verb phrase translation pattern.

A method according to a second aspect of the present disclosure includes: a predicate and argument recognizing step that recognizes predicates and arguments of a source sentence and a target sentence using a syntax analysis result of the source sentence and a word alignment result between the source sentence and the target sentence from a plurality of bilingual parallel corpus; a translation pattern candidate extracting step that extracts a translation pattern candidate including an original sentence pattern and a translation pattern using the recognized predicates and arguments of the source sentence and the target sentence and confirms the corresponding occurrence frequency; a translation pattern candidate verifying step that verifies the extracted translation pattern candidate using the occurrence frequency of the original sentence pattern or the translation pattern for the extracted translation pattern candidate and generates a first verb phrase translation pattern according to the verification result; and a translation pattern generalizing step that generalizes the generated first verb phrase translation pattern to generate a second verb phrase translation pattern.

Preferably, the predicate and argument recognizing step includes: a step of receiving the plurality of bilingual parallel corpus to recognize the predicate and argument of the source sentence using the syntax analysis result of the source sentence; and a step of recognizing the predicate and argument of the target sentence corresponding to the recognized predicate and argument of the source sentence using the word alignment result.

Preferably, the translation pattern candidate extracting step extracts the same translation pattern candidate from different source sentence and target sentence and calculates the occurrence frequency of the extracted same translation pattern candidate.

Preferably, the translation pattern candidate verifying step compares the occurrence frequency of the original sentence pattern for the extracted translation pattern candidate with a predetermined threshold and removes the corresponding translation pattern candidate when the occurrence frequency is lower than the threshold.

Preferably, if the occurrence frequency of the translated part pattern is lower than the predetermined threshold, the translation pattern candidate verifying step removes the corresponding translation pattern candidate from the extracted same translation pattern candidates.

Preferably, if among the extracted same translation pattern candidates, a translation pattern candidate has the occurrence frequency of the translated part pattern which is lower than the predetermined threshold, the translation pattern candidate verifying unit verifies the extracted same translation pattern candidates depending on whether the arguments of the translation pattern is plural and another translated part pattern including the translated part pattern is present.

Preferably, when the arguments of the generated first verb phrase translation pattern are generalized to a syntax phrase label, the translation pattern generalizing step confirms whether to be an effective verb phrase translation pattern to generalize the first verb phrase translation pattern and generate the second verb phrase translation pattern.

Preferably, the translation pattern generalizing step includes: a pattern grouping step of making a group of patterns having the same predicate of the original sentence pattern among the first verb phrase translation patterns; a tuple extracting step of extracting tuples for all patterns that belong to the same group; and a pattern generating step of generating a second verb phrase translation pattern using the frequencies of the extracted tuples.

Preferably, the pattern generating step generalizes arguments other than an argument corresponding to a tuple having the highest frequency among the frequencies of the extracted tuples to generate the second verb phrase translation pattern.

Preferably, the translation pattern generalizing step further includes: a translation ambiguity analyzing step of analyzing the translation ambiguity for the generated second verb phrase translation pattern to determine the second verb phrase translation pattern.

Preferably, the translation pattern generalizing step repeatedly performs the translation pattern generalizing step for the determined second verb phrase translation pattern.

Advantageous Effects

According to the present disclosure, it is possible to recognize a predicate and an argument using a syntax analysis result and a word alignment result of a source sentence from a plurality of bilingual parallel corpus, extracts a translation pattern candidate and an occurrence frequency using the recognized predicate and argument, and then generate a basic verb phrase translation pattern by verifying the translation pattern candidate, and generalizes the generated basic verb phrase translation pattern to generate a general verb phrase pattern so as to be applied to various language pairs and minimize an error in the verb phrase translation pattern and determine an appropriate generalization level using a co-occurrence frequency of a predicate and an argument of the verb phrase translation pattern and a translation probability of the predicate.

In other words, the present disclosure uses only a word or a tree alignment result, a source or target language, and a parser for one language using bilingual parallel corpus so that the verb phrase translation pattern is automatically constructed without being limited to a specific language pair.

The present disclosure automatically generates a plurality of verb phrase translation patterns from a large amount of bilingual parallel corpus so that the performance of the machine translation is improved and the cost and time for constructing the verb phrase translation pattern are reduced.

Further, the present disclosure minimizes the intervention of human so that a better quality of translation knowledge is constructed without receiving help from the language professionals.

DESCRIPTION OF MAIN REFERENCE
NUMERALS OF DRAWINGS

200: Verb phrase translation pattern constructing apparatus
210: Predicate and argument recognizing unit
220: Translation pattern candidate extracting unit
230: Translation pattern candidate verifying unit
240: Translation pattern generalizing unit
250: Translation pattern candidate storing unit
260: Translation pattern storing unit

BEST MODE

Hereinafter, exemplary embodiments of the present disclosure will be described in detail with reference to accompanying drawings. Configurations and effects thereof will be apparently understood through the following detailed description. In the figures, the same reference numbers refer to the same or equivalent parts of the present disclosure throughout the several figures of the drawing. However, if it is considered that description of related known configuration or function may make the gist of the present disclosure unclear, the description will be omitted.

Figure 1:
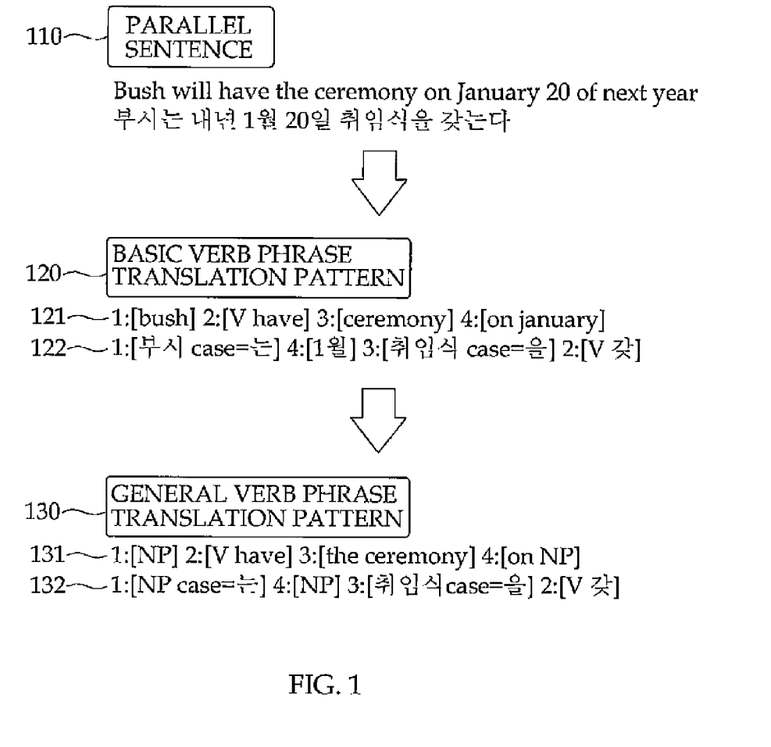
FIG. 1 is an exemplary diagram of an exemplary embodiment for a verb phrase translation pattern which is applied to the present disclosure.

FIG. 1 is an exemplary diagram of an exemplary embodiment for a verb phrase translation pattern which is applied to the present disclosure.

Prior to the description of the present disclosure, types and terminologies of a verb phrase translation pattern extracted from one parallel sentence will be described.

As shown in FIG. 1, a parallel sentence 110 consists of a source sentence of "Bush will have the ceremony on January 20 of next year" and a target sentence of "부시는 내년 1월 20일 취임식을 갖는다"

The present disclosure constructs a verb phrase pattern from a plurality of parallel sentences 110. The verb phrase pattern constructed in the present disclosure is largely divided into a basic verb phrase translation pattern 120 and a general verb phrase translation pattern 130. One verb phrase translation pattern consists of a pair of an original sentence pattern 121 and a translated part pattern 122. "1: [bush], 2: [V have], 3: [ceremony], and 4: [on January]" shown in FIG. 2 correspond to the original sentence pattern 121 and "1:부시 [case=는] 4:[1월] 3:[취임식 case=을] 2:[V갖]" corresponds to the translated part pattern 122. In order to simply represent the verb phrase translation pattern, an arbitrary verb phrase pattern will be referred to as "P=<LHS, RHS>" in the following description. In this case, LHS (left hand side) corresponds to the original sentence pattern 121 and RHS (right hand side) corresponds to the translated part pattern 122. The original sentence pattern 121 and the translated part pattern 122 are commonly referred to as a verb phrase pattern and distinguished from a verb phrase translation pattern.

In the example shown in FIG. 1, a source sentence of the parallel sentence 110 is English and a target sentence is Korean. However, the example may be applied to all language pairs where a syntax analysis result and bilingual parallel corpus of a verb phrase translation pattern constructing apparatus according to the present disclosure are present.

The original sentence pattern LHS 121 corresponding to the English verb phrase pattern consists of one predicate and a plurality of arguments. In an example, the predicate of the original sentence pattern 121 is "have" and all of "bush", "ceremony", and "on January" corresponds to arguments. The translated part pattern RHS 122 consists of a translated predicate (for example, "갖") corresponding to a predicate of the original sentence and translated arguments corresponding to arguments of the original sentence (for example, "부시", "1월", "취임식"). The predicates and arguments are represented by cross-reference numerals such as "number:" so as to understand the relationship therebetween.

The basic verb phrase translation pattern 120 refers to a pattern in which all arguments in the translation pattern are represented by vocabularies. The general verb phrase translation pattern 130 represents some arguments in the basic verb phrase translation pattern 120 by phrase labels such as a noun phrase NP, a verb phrase VP, or an adverb phrase ADVP. Here, the "verb phrase" in the phrase label and the verb phrase of the "verb phrase translation pattern" are different concepts from each other. The general verb phrase translation pattern represented using the phrase label may translate more sentences than the basic verb phrase translation pattern. For example, the basic verb phrase translation pattern shown in FIG. 1 may be applied only to a sentence in which the subject is "bush" and an "adverb phrase" is "on January". In contrast, the general verb phrase translation pattern may be applied to all sentences in which the subject is a predetermined noun phrase and the preposition "on" is followed by any noun phrase.

The above-described terminologies are simple definitions of the verb phrase translation pattern used in the present disclosure. However, the terminologies are one of the various methods that define the verb phrase translation pattern and generally any type which may be called a verb phrase pattern may be constructed by applying the present disclosure thereto.

Figure 2:
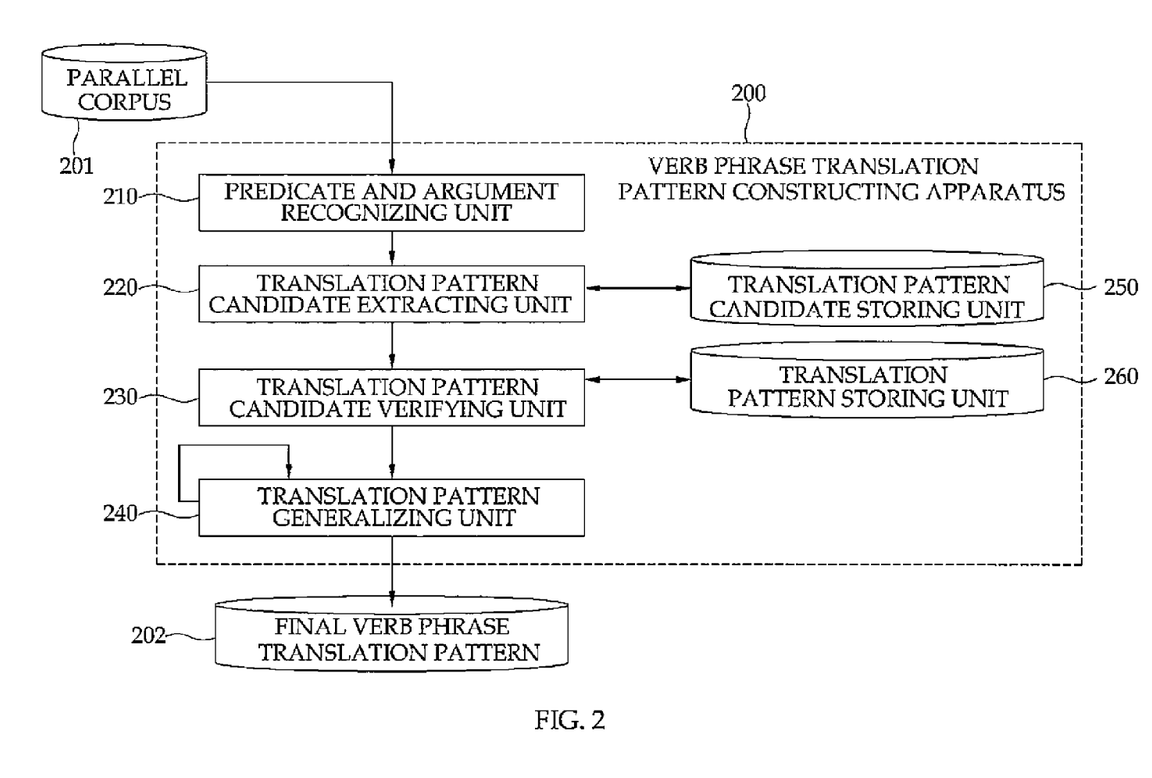
FIG. 2 is a configuration diagram of an exemplary embodiment of an apparatus of constructing a verb phrase translation pattern using bilingual parallel corpus according to the present disclosure.

FIG. 2 is a configuration diagram of an exemplary embodiment of an apparatus of constructing a verb phrase translation pattern using bilingual parallel corpus according the present disclosure.

As shown in FIG. 2, the verb phrase translation pattern constructing apparatus 200 according to the present disclosure includes a predicate and argument recognizing unit 210, a translation pattern candidate extracting unit 220, a translation pattern candidate verifying unit 230, a translation pattern generalizing unit 240, a translation pattern candidate storing unit 250, and a translation pattern storing unit 260.

The verb phrase translation pattern constructing apparatus 200 according to the present disclosure receives a plurality of bilingual parallel corpus 201. The parallel corpus 201 consists of a source sentence and a target sentence.

The predicate and argument recognizing unit 210 recognizes predicates and arguments of the source sentence and the target sentence using a syntax analysis result of the source sentence and a word alignment result between the source sentence and the target sentence from the plurality of bilingual parallel corpus. The predicate and argument recognizing unit 210 receives the plurality of bilingual parallel corpus to recognize the predicate and argument of the source sentence using the syntax analysis result of the source sentence and recognize the predicate and argument of the target sentence corresponding to the recognized predicate and argument of the source sentence using the word alignment result.

The translation pattern candidate extracting unit 220 extracts a translation pattern candidate including an original sentence pattern and a translated part pattern using the recognized predicates and arguments of the source sentence and the target sentence and confirms the occurrence frequency. The translation pattern candidate extracting unit 220 extracts the same translation pattern candidate from different source sentence and target sentence and calculates the occurrence frequency of the extracted same translation pattern candidate.

The translation pattern candidate verifying unit 230 verifies the extracted translation pattern candidate using the occurrence frequency of the original sentence pattern and the translated part pattern for the extracted translation pattern candidate and generates a first verb phrase translation pattern according to the verification result. The translation pattern candidate verifying unit 230 compares the occurrence frequency of the original sentence pattern for the extracted translation pattern candidate with a predetermined threshold and removes the corresponding translation pattern candidate when the occurrence frequency is lower than the threshold. Further, if the occurrence frequency of the translated part pattern is lower than the predetermined threshold, the translation pattern candidate verifying unit 230 removes the corresponding translation pattern candidate from among a plurality of translation pattern candidates having the same original sentence pattern. If among the extracted same translation pattern candidates, a translation pattern candidate has the occurrence frequency of the translated part pattern which is lower than the predetermined threshold, the translation pattern candidate verifying unit 230 verifies the extracted same translation pattern candidates depending on whether the arguments of the translation pattern is plural and another translated part pattern including the translated part pattern is present.

The translation pattern generalizing unit 240 generalizes the generated first verb phrase translation patterns to generate second verb phrase translation patterns. When the arguments of the generated first verb phrase translation patterns are generalized to a syntax phrase label, the translation pattern generalizing unit 240 confirms whether to be an effective verb phrase translation pattern to generalize the first verb phrase translation patterns and generate the second verb phrase translation patterns. The translation pattern generalizing unit 240 makes a group of patterns having the same predicate of the original sentence pattern among the first verb phrase translation patterns and generates a second verb phrase translation pattern for all patterns that belong to the same group using tuples and the frequencies of the extracted tuples. The translation pattern generalizing unit 240 generalizes arguments other than an argument corresponding to a tuple having the largest frequency among the frequencies of the extracted tuples to generate the second verb phrase translation pattern. The translation pattern generalizing unit 240 analyzes the translation ambiguity for the generated second verb phrase translation pattern to determine the second verb phrase translation pattern. The translation pattern generalizing unit 240 repeatedly generalizes the translation pattern in the translation pattern generalizing unit for the determined second verb phrase translation pattern.

The translation pattern candidate storing unit 250 stores a translation pattern candidate extracted from the translation pattern candidate extracting unit.

The translation pattern storing unit 260 stores the first verb phrase translation pattern generated in the translation pattern candidate verifying unit.

Figure 3:
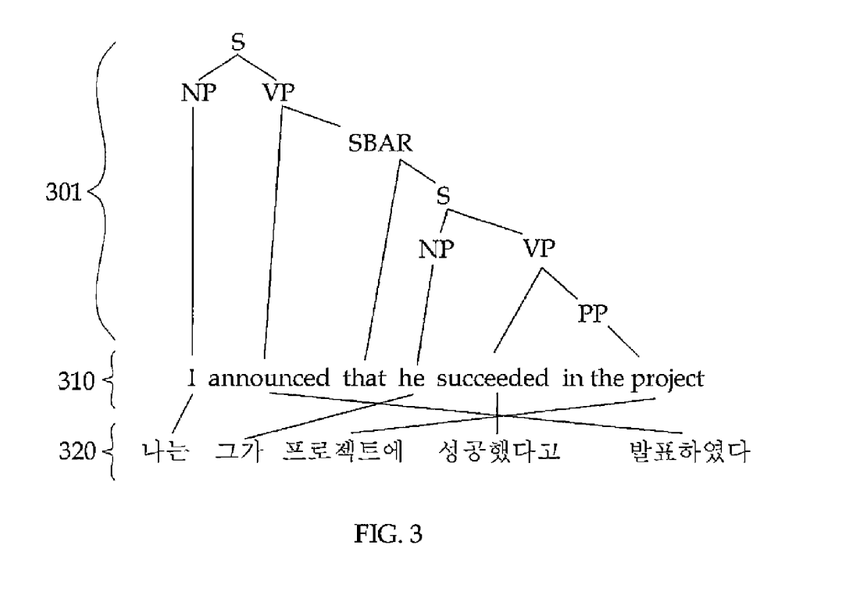
FIG. 3 is an exemplary diagram of an exemplary embodiment for recognizing a predicate and an argument in a predicate and argument recognizing unit of FIG. 2 according to the present disclosure.

FIG. 3 is an exemplary diagram of an embodiment for recognizing a predicate and an argument in the predicate and argument recognizing unit of FIG. 2 according to the present disclosure.

As shown in FIG. 3, the predicate and argument recognizing unit 210 analyzes the source sentence of the input bilingual parallel corpus 201 and recognizes the predicates and the arguments using the syntax analysis result 301 of the source sentence 310 and the word alignment result between the source sentence and the target sentence 320. The predicate and argument recognizing unit 210 finds out the predicates and the arguments using a sentence parser that outputs predicate and argument information. The predicate and argument recognizing unit 210 recognizes the predicates and the argument in the source sentence and then finds out a target word corresponding to the predicates and arguments using the word alignment result. There are various methods that recognize the predicates and arguments from the sentence which has been analyzed other than the embodiment that is applied to the present disclosure, so that the recognizing of the predicates and arguments is not limited to a specific recognizing method.

In this case, a part corresponding to a predicate of the source sentence 310 may not function as a predicate of the target sentence 320 due to the verbal difference and the liberal translation. For example, it is considered that the source sentence 310 is an English sentence of "He succeeded in sailing the world" and the target sentence 320 is a Korean translated sentence of "그는 세계 일주 항해에 성공했다". In the English sentence and the Korean translated sentence thereof, "sailing" which is the English predicate is translated into "항해" which is a noun in the Korean translated sentence. Therefore, a part corresponding to an English verb phrase pattern may not be a Korean verb phrase.

However, also in this case, when the source sentence 310 is translated by putting the verb phrase patterns of the source sentence 310 together as one unit, more natural translation result may be obtained. Therefore, it is advantageous to construct the verb phrase translation pattern according to the present disclosure. Therefore, in the present disclosure, the verb phrase pattern (original sentence pattern) of the source sentence 310 and the translation pattern of the target sentence 320 thereof are considered as the verb phrase translation pattern.

In the meantime, the translation pattern candidate extracting unit 220 extracts the original sentence pattern, the translated part pattern, and the basic verb phrase translation pattern using the predicates and arguments of the source sentence 310 and the predicates and arguments of the target sentence 320 recognized in the predicate and argument recognizing unit 210. Here, since the generated basic verb phrase translation pattern does not yet go through error verification, the basic verb phrase translation pattern is stored in the translation pattern candidate storing unit 150. Since the same translation pattern candidate from the parallel sentence of different bilingual parallel corpus 201 may be extracted, one verb phrase translation pattern may be extracted from the entire bilingual parallel corpus several times. When the translation pattern candidate is extracted, the translation pattern candidate extracting unit 220 confirms the extracting frequency that the corresponding translation pattern candidate is extracted from the entire bilingual parallel corpus 201 and the translation pattern candidate storing unit 150 may store the confirmed extracting frequency together.

The translation pattern candidate verifying unit 230 verifies all translation pattern candidates extracted from the translation pattern candidate extracting unit 220. Here, the translation pattern candidate is verified so as to exclude verb phrase translation patterns which are erroneously extracted due to errors in the syntax analysis and the word alignment.

A process of verifying the translation pattern candidate will be specifically described. The translation pattern candidate verifying unit 230 calculates the original sentence pattern of the translation pattern and an occurrence frequency of the original sentence pattern LHS for all translation pattern candidates stored in the translation pattern candidate storing unit 250. If the occurrence frequency of the original sentence pattern is lower than a threshold, the translation pattern candidate verifying unit 230 considers the translation pattern candidate as an erroneously extracted translation pattern and removes the translation pattern candidate from the pattern candidate storing unit 250.

If among the translation pattern candidates whose original pattern is the same, a translation pattern candidate has a frequency of the translated part pattern RHS which is lower than a predetermined frequency, the translation pattern candidate verifying unit 230 removes the translation pattern candidate from the translation pattern candidate storing unit 250. In this case, the translation pattern candidate verifying unit 230 confirms whether a translation pattern having n arguments of the translated part pattern includes the corresponding translated part pattern. If there is such a translation pattern as a confirmation result, the translation pattern candidate verifying unit 230 does not remove the corresponding translation pattern. For example, it will be described below that the original sentence patterns are the same and the translated part pattern has translation pattern candidates P1 and P2 such as "P1=< . . . , 1:[부사 case=는] 3:[취임식 case=을] 2:[V갖]>" and "P2=< . . . , 1:[부사 case=는] 4:[1월] 3:[취임식 case=을] 2:[V갖]>". Even though the occurrence frequency of the translated part pattern of the translation pattern candidate P1 is lower than a predetermined threshold, the translated part pattern of P1 is included in the translated part pattern of P2. Therefore, the translation pattern candidate verifying unit 230 does not remove P1 when the occurrence frequency of the translated part pattern of P2 is higher than a threshold in order to verify the translation pattern candidate by considering a phenomenon that an argument is omitted during the translation process.

Through the process of verifying the translation pattern candidate as described above, the translation pattern candidate verifying unit 230 removes translation pattern candidates having a higher error probability from the translation pattern candidate storing unit 250. The translation pattern candidate verifying unit 230 considers translation pattern candidates which remain without being removed as a basic verb phrase translation pattern and stores the remaining translation pattern candidates in the translation pattern storing unit 260.

As described above, the general verb phrase translation pattern refers to the basic verb phrase translation pattern whose some or all arguments are generalized to a syntax phrase label. The translation pattern generalizing unit 240 generalizes the basic verb phrase translation pattern that is verified by the translation pattern candidate verifying unit 230. The verb phrase translation pattern is generalized in order to increase applicability of the constructed translation pattern. However, if the verb phrase translation pattern is excessively generalized, the translation ambiguity of the translation pattern is increased. Therefore, referring to FIG. 4, a process of generalizing the translation pattern performed in the translation pattern generalizing unit 240 will be described.

Figure 4:
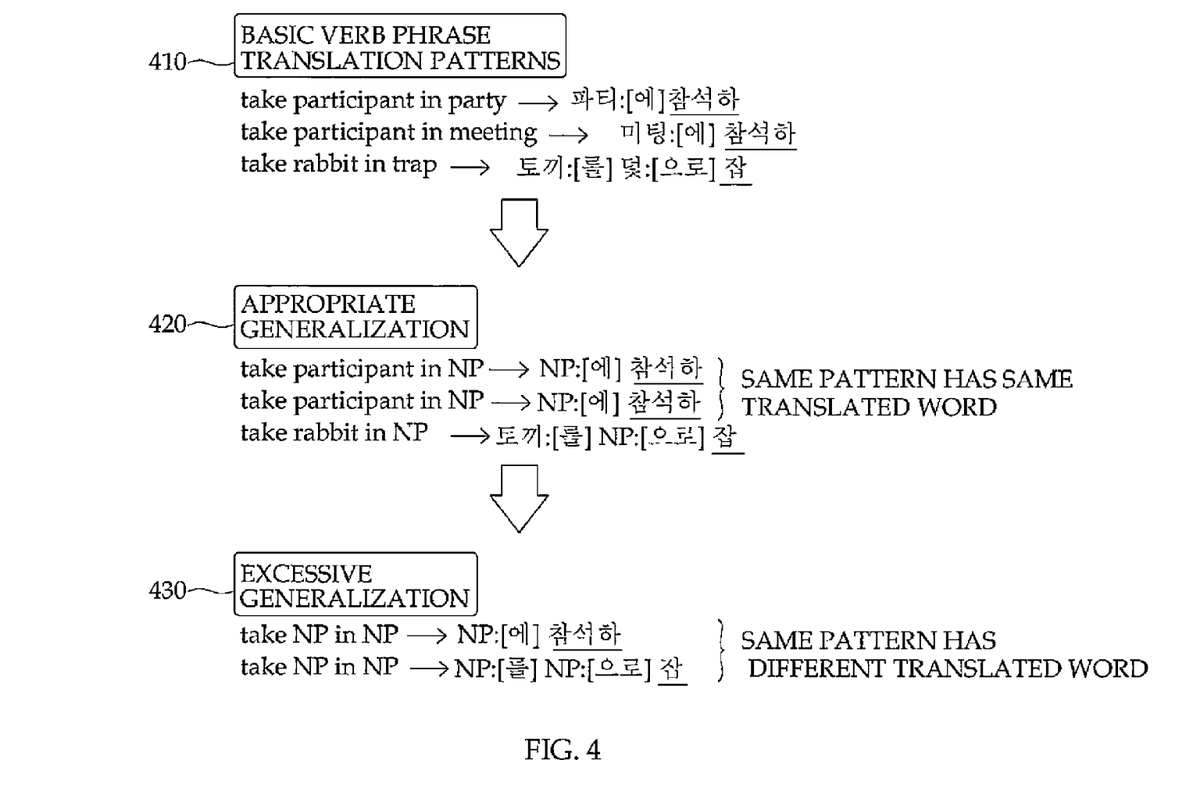
FIG. 4 is an exemplary diagram of an exemplary embodiment for generalizing a translation pattern in a translation pattern generalizing unit of FIG. 2 according to the present disclosure.

FIG. 4 is an exemplary diagram for an embodiment for generalizing a translation pattern in the translation pattern generalizing unit of FIG. 2 according to the present disclosure.

As shown in FIG. 4, it will be described that basic verb phrase translation patterns 410 include "take participant in party" and "파티:[에] 참석하", "take participant in meeting" and "미팅:[에] 참석하", "take rabbit in trap" and "토끼:[를] 덫:[으로[ 잡".

The translation pattern generalizing unit 240 appropriately may generalize one argument such as "take participant in NP" from "take participant in party" and "take participant in meeting". An appropriate generalization 420 may help to translate various sentences corresponding thereto into "~에 참석하다".

However, in a case of an excessive generalization 430 that generalizes both arguments such as "take NP in NP", translation ambiguity of whether "take" is translated into "참석하다'" or "잡다" occurs.

As a result, the usefulness of the verb phrase translation pattern is reduced. Therefore, when every argument is generalized to the syntax phrase label one by one, the translation pattern generalizing unit 240 determines whether the pattern is still an available pattern to generate a general verb phrase translation pattern.

A process of generating the general verb phrase translation pattern will be described below.

The translation pattern generalizing unit 240 ties patterns having the same predicate of the original sentence pattern from the basic verb phrase translation pattern as one group, which is referred to as "Gv". For example, patterns having "take" as a predicate of the original sentence pattern among the basic verb phrase translation pattern belong to a "Gtake" group.

The translation pattern generalizing unit 240 extracts the "tuples" including "a predicate of the original sentence, an argument of the original sentence, and a predicate of the translated part" for all patterns belonging to the same group and calculates a frequency of each of the tuples.

For example, in order to generalize the basic verb phrase translation patterns 410 shown in FIG. 4 as the general verb phrase translation patterns, tuples to be generated will be described as follows.

The translation pattern generalizing unit 240 extracts the tuple of "take, participant, 참석하" from the same group. Here, the frequency of the tuple is 2. The translation pattern generalizing unit 240 extracts the tuple of "take, in party, 참석하" from the same group. Here, the frequency of the tuple is 1. The translation pattern generalizing unit 240 extracts the tuples of "take, in meeting, 참석하" from the same group. Here, the frequency of the tuple is 1. The translation pattern generalizing unit 240 extracts the tuple of "take, rabbit, 잡" from the same group. Here, the frequency of the tuple is 1. The translation pattern generalizing unit 240 extracts the tuple of "take, in trap, 잡" from the same group. Here, the frequency of the tuple is 1.

The translation pattern generalizing unit 240 generalizes arguments excluding the argument corresponding to the tuple having the highest frequency among the extracted tuples one by one. Here, since the frequency of the tuple of "take, participant, 참석하" is the highest, the translation pattern generalizing unit 240 generalizes first the arguments except the "participant" to generate the general verb phrase translation pattern candidate.

The translation pattern generalizing unit 240 searches the translation ambiguity for the generated translation pattern candidate and considers the translation pattern candidate that does not have the translation ambiguity as a correct general verb phrase translation pattern.

The translation pattern generalizing unit 240 may generate more generalized verb phrase translation pattern while repeating the translation pattern generalizing process two to four times for the newly created general verb phrase translation patterns.

The verb phrase translation pattern generalization in the present disclosure is not limited to the generalization to the syntax phrase label. When a language resource such as a sense ontology is given, it is possible to generalize the translation pattern to a sense code using the present disclosure.

Figure 5:
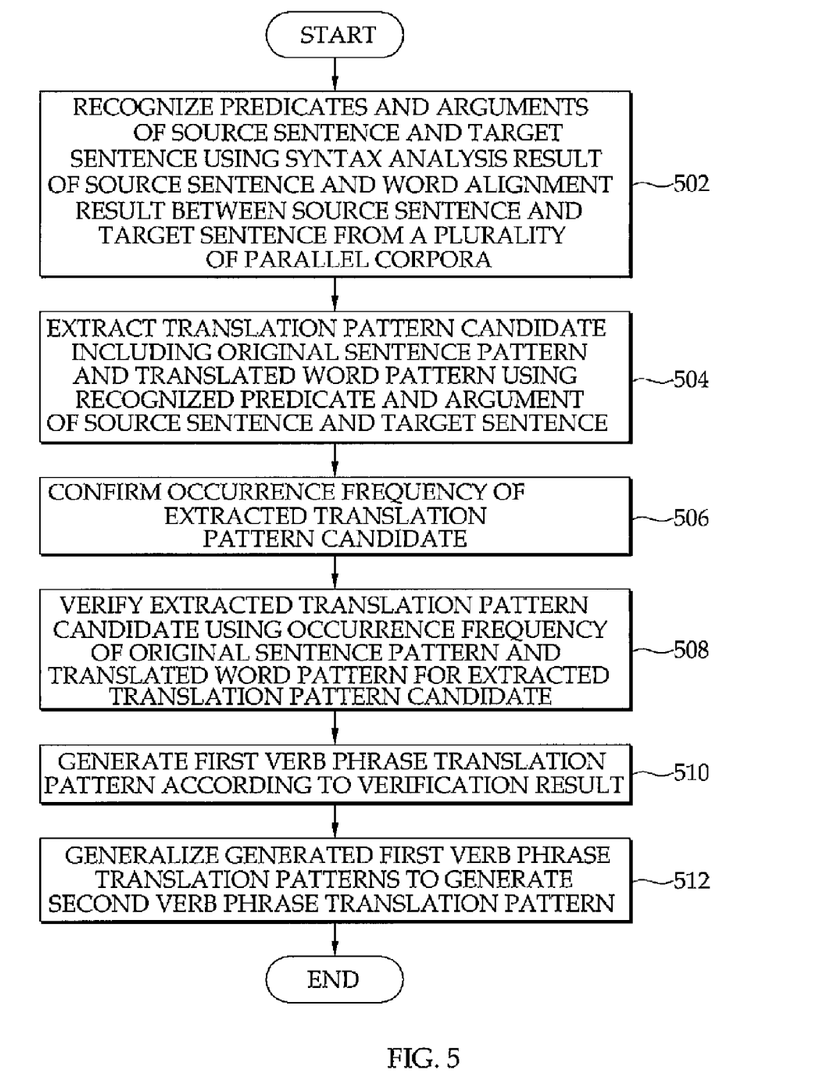
FIG. 5 is a flow chart of an embodiment for a method of constructing a verb phrase translation pattern using bilingual parallel corpus according to the present disclosure.

FIG. 5 is a flow chart of an embodiment for a method of constructing a verb phrase translation pattern using bilingual parallel corpus according to the present disclosure.

The predicate and argument recognizing unit 210 recognizes a predicate and an argument of a source sentence and a target sentence using a syntax analysis result of the source sentence and a word alignment result between the source sentence and the target sentence from a plurality of bilingual parallel corpus (502). The predicate and argument recognizing unit 210 receives the plurality of bilingual parallel corpus to recognize the predicate and the argument of the source sentence using the syntax analysis result of the source sentence and recognize the predicate and the argument of the target sentence corresponding to the recognized predicate and argument of the source sentence using the word alignment result.

The translation pattern candidate extracting unit 220 extracts a translation pattern candidate including an original sentence pattern and a translated part pattern using the predicates and the arguments of the source sentence and the target sentence recognized in the predicate and argument recognizing unit 210 (504).

The translation pattern candidate extracting unit 220 confirms an occurrence frequency for the translation pattern candidate including the extracted original sentence pattern and translated part pattern (504). The translation pattern candidate extracting unit 220 extracts the same translation pattern candidate from the different source sentence and target sentence and calculates the occurrence frequency of the extracted same translation pattern candidate.

The translation pattern candidate verifying unit 230 verifies the extracted translation pattern candidate using the occurrence frequency of the original sentence pattern or the translated part pattern for the translation pattern candidate extracted in the translation pattern candidate extracting unit 220 (508).

The translation pattern candidate verifying unit 230 generates a first verb phrase translation pattern according to the verification result (510). Here, the verifying process will be specifically described. The translation pattern candidate verifying unit 230 compares the occurrence frequency of the original sentence pattern for the translation pattern candidate with a predetermined threshold and removes the corresponding translation pattern candidate when the occurrence frequency is lower than the threshold. Further, if among extracted same translation pattern candidates, a translation pattern candidate has the occurrence frequency of the translated part pattern which is lower than the predetermined threshold, the translation pattern candidate verifying unit 230 removes the corresponding translation pattern candidate. If among the extracted same translation pattern candidates, a translation pattern candidate has the occurrence frequency of the translated part pattern which is lower than the predetermined threshold, the translation pattern candidate verifying unit 230 may verify the same translation pattern candidates depending on whether the arguments of the translation pattern is plural and another translation pattern including the translation pattern is present.

The translation pattern generalizing unit 240 generalizes the first verb phrase translation patterns generated in the translation pattern candidate verifying unit 230 to generate a second verb phrase translation pattern. When the arguments of the first verb phrase translation patterns generated in the translation pattern candidate verifying unit 230 are generalized to a syntax phrase label, the translation pattern generalizing unit 240 confirms whether to be an effective verb phrase translation pattern to generalize the first verb phrase translation patterns and generate the second verb phrase translation patterns. Here, the translation pattern generalization process will be specifically described. The translation pattern generalizing unit 240 makes a group of patterns having the same predicate of the original sentence pattern in the first verb phrase translation patterns. The translation pattern generalizing unit 240 extracts tuples for all patterns that belong to the same group. Continuously, the translation pattern generalizing unit 240 generates a second verb phrase translation pattern using the frequencies of the extracted tuples. The translation pattern generalizing unit 240 generalizes arguments other than arguments corresponding to a tuple having the highest frequency among the frequencies of the extracted tuples to generate the second verb phrase translation patterns. The translation pattern generalizing unit 240 analyzes the translation ambiguity for the generated second verb phrase translation pattern to determine the second verb phrase translation pattern. The translation pattern generalizing unit 240 may repeatedly generalize the translation pattern for the determined second verb phrase translation pattern.

As described above, the verb phrase translation pattern constructing apparatus 200 according to the present disclosure constructs a verb phrase translation pattern using the bilingual parallel corpus and the syntax analysis information.

The verb phrase translation pattern constructing apparatus 200 automatically aligns words only using a co-occurrence frequency of words in the bilingual parallel corpus so that it does not require an additional language resource such as a dictionary and the tree alignment is performed using parsing information of one of two target languages. Since the verb phrase translation pattern constructing apparatus 200 extracts the verb phrase pattern from the result, ambiguity of the translated word can be automatically resolved and a corresponding pattern of the target language for all available verb phrase pattern of the native language can be automatically completed to be extracted.

Since the verb phrase translation pattern constructing apparatus 200 uses only the syntax analysis result and word alignment result for the source in terms of a language independency, the verb phrase translation pattern constructing apparatus 200 may be applied to various language pairs.

In order to minimize the errors of the verb phrase translation pattern, the verb phrase translation pattern constructing apparatus 200 automatically removes the translation pattern which is erroneously generated while automatically constructing the patterns. The present disclosure extracts the verb phrase translation pattern candidates from the large amount of bilingual parallel corpus and calculates occurrence frequencies of the pattern candidates. Then, the verb phrase translation pattern constructing apparatus 200 removes a verb phrase translation pattern which may be erroneously generated using the occurrence frequency and the translation probability of elements that configure the translation pattern and considers only the remaining candidates as a correct verb phrase translation pattern.

The verb phrase translation pattern constructing apparatus 200 may determine a translation pattern generalization level that uses a predicate-argument co-occurrence frequency and a predicate translation probability. When a pattern is generalized in a natural language processing, the applicability of the pattern is improved but the ambiguity of the pattern is increased, which is similar to the verb phrase translation pattern. When a verb phrase translation pattern is generalized, the verb phrase translation pattern may be applied to more sentences. However, excessive generalization increases the translation ambiguity. Therefore, the verb phrase translation pattern constructing apparatus 200 may determine an appropriate generalization level using the co-occurrence frequency of the predicate and the argument of the translation pattern and the translation probability of the predicate.

In the meantime, the present disclosure may implement the above-described verb phrase translation pattern constructing method as a software program and record the method in a predetermined computer readable recording medium to be applied to various reproducing devices.

The various reproducing devices may be a PC, a notebook computer, or a portable terminal.

For example, the recording medium may be a hard disk, a flash memory, a RAM, or a ROM which is installed in the reproducing device, or an optical disk such as a CD-R, a CD-RW, a compact flash card, a smart media, a memory stick, or a multimedia card which is externally installed.

In this case, as described above, the program that is recorded in a computer readable recording medium may be performed so as to include a predicate and argument recognizing process that recognizes predicates and arguments of a source sentence and a target sentence using a syntax analysis result of the source sentence and a word alignment result between the source sentence and the target sentence from a plurality of bilingual parallel corpus, a translation pattern candidate extracting process that extracts a translation pattern candidate including an original sentence pattern and a translated part pattern using the recognized predicates and arguments of the source sentence and the target sentence and confirms the corresponding occurrence frequency, a translation pattern candidate verifying process that verifies the extracted translation pattern candidate using the occurrence frequency of the original sentence pattern or the translated part pattern for the extracted translation pattern candidate and generates a first verb phrase translation pattern according to the verification result, and a translation pattern generalizing process that generalizes the generated first verb phrase translation patterns to generate second verb phrase translation patterns.

While the exemplary embodiment of the present disclosure has been described using specific terms, such description is for illustrative purpose only, and it is to be understood that changes and variations may be made without departing from the spirit of scope of the following claims. The scope of the disclosure is to be interpreted by the following claims and all technologies within the equational range are to be interpreted to be covered by the scope of the disclosure.

[Industrial Applicability]

The present disclosure recognizes a predicate and an argument using a syntax analysis result and a word alignment result of a source sentence from a plurality of bilingual parallel corpus, extracts a translation pattern candidate and an occurrence frequency using the recognized predicate and argument, and then generates a basic verb phrase translation pattern by verifying the translation pattern candidate, and generalizes the generated basic verb phrase translation pattern to generate a general verb phrase pattern so as to be applied to various language pairs and minimize an error in the verb phrase translation pattern and determine an appropriate generalization level using a co-occurrence frequency of a predicate and an argument of the verb phrase translation pattern and a translation probability of the predicate.

The invention claimed is:

1. A verb phrase translation pattern constructing apparatus using bilingual parallel corpus, the apparatus comprising a computer, the computer configured to include:
a predicate and argument recognizing unit configured to recognize predicates and arguments of a source sentence and a target sentence using a syntax analysis result of the source sentence and a word alignment result between the source sentence and the target sentence from a plurality of bilingual parallel corpus;
a translation pattern candidate extracting unit configured to extract a translation pattern candidate including an original sentence pattern and a translated part pattern using the recognized predicates and arguments of the source sentence and the target sentence and confirm the corresponding occurrence frequency;
a translation pattern candidate verifying unit configured to verify the extracted translation pattern candidate using the occurrence frequency of the original sentence pattern or the translated part pattern for the extracted translation pattern candidate and generate a first verb phrase translation pattern according to the verification result; and
a translation pattern generalizing unit configured to generalize the generated first verb phrase translation patterns to generate a second verb phrase translation pattern,
wherein the translation pattern generalizing unit is configured to
make a group of patterns having the same predicate of the original sentence pattern among the first verb phrase translation patterns, and
generate a second verb phrase translation pattern for all patterns that belong to the same group using tuples and the frequencies of the extracted tuples.

2. The verb phrase translation pattern constructing apparatus using bilingual parallel corpus of claim 1, further comprising:
a translation pattern candidate storing unit configured to store a translation pattern candidate extracted from the translation pattern candidate extracting unit; and
a translation pattern storing unit configured to store the first verb phrase translation pattern generated in the translation pattern candidate verifying unit.

3. The verb phrase translation pattern constructing apparatus using bilingual parallel corpus of claim 1, wherein the predicate and argument recognizing unit is configured to receive the plurality of bilingual parallel corpus to recognize the predicate and argument of the source sentence using the syntax analysis result of the source sentence and recognize the predicate and argument of the target sentence corresponding to the recognized predicate and argument of the source sentence using the word alignment result.

4. The verb phrase translation pattern constructing apparatus using bilingual parallel corpus of claim 1, wherein the translation pattern candidate extracting unit is configured to extract the same translation pattern candidate from different source sentence and target sentence and calculate the occurrence frequency of the extracted same translation pattern candidate.

5. The verb phrase translation pattern constructing apparatus using bilingual parallel corpus of claim 1, wherein the translation pattern candidate verifying unit is configured to compare the occurrence frequency of the original sentence pattern for the extracted translation pattern candidate with a predetermined threshold and remove the corresponding translation pattern candidate when the occurrence frequency is lower than the threshold.

6. The verb phrase translation pattern constructing apparatus using bilingual parallel corpus of claim 1, wherein if the occurrence frequency of the translated part pattern is lower than a predetermined threshold, the translation pattern candidate verifying unit is configured to remove the corresponding translation pattern candidate from a plurality of translation pattern candidates having the same original sentence pattern.

7. The verb phrase translation pattern constructing apparatus using bilingual parallel corpus of claim 6, wherein if among the extracted same translation pattern candidates, a translation pattern candidate has the occurrence frequency of the translated part pattern which is lower than the predetermined threshold, the translation pattern candidate verifying unit is configured to verify the extracted same translation pattern candidates depending on whether the arguments of the translation pattern is plural and another translated part pattern including the translated part pattern is present.

8. The verb phrase translation pattern constructing apparatus using bilingual parallel corpus of claim 1, wherein when the arguments of the generated first verb phrase translation pattern are generalized to a syntax phrase label, the translation pattern generalizing unit is configured to verify whether the first verb phrase translation pattern is an effective verb phrase translation pattern and generalize the first verb phrase translation pattern to generate the second verb phrase translation pattern.

9. The verb phrase translation pattern constructing apparatus using bilingual parallel corpus of claim 1, wherein the translation pattern generalizing unit is configured to generalize arguments other than an argument corresponding to a tuple having the highest frequency among the frequencies of the extracted tuples to generate the second verb phrase translation pattern.

10. The verb phrase translation pattern constructing apparatus using bilingual parallel corpus of claim 1, wherein the translation pattern generalizing unit is configured to analyze the translation ambiguity for the generated second verb phrase translation pattern to determine the second verb phrase translation pattern.

11. The verb phrase translation pattern constructing apparatus using bilingual parallel corpus of claim 10, wherein the translation pattern generalizing unit is configured to repeatedly generalize the translation pattern in the translation pattern generalizing unit for the determined second verb phrase translation pattern.

12. A verb phrase translation pattern constructing method using bilingual parallel corpus, the method performed by a computer and comprising:
- recognizing predicates and arguments of a source sentence and a target sentence using a syntax analysis result of the source sentence and a word alignment result between the source sentence and the target sentence from a plurality of bilingual parallel corpus;
- extracting a translation pattern candidate including an original sentence pattern and a translation pattern using the recognized predicates and arguments of the source sentence and the target sentence, and confirming the corresponding occurrence frequency;
- verifying the extracted translation pattern candidate using the occurrence frequency of the original sentence pattern or the translation pattern for the extracted translation pattern candidate, and generating a first verb phrase translation pattern according to the verification result; and
- generalizing the generated first verb phrase translation pattern to generate a second verb phrase translation pattern,
- wherein the generalizing of the generated first verb phrase translation pattern comprises:
  - making a group of patterns having the same predicate of the original sentence pattern among the first verb phrase translation patterns, and
  - generating the second verb phrase translation pattern for all patterns that belong to the same group using tuples and the frequencies of the extracted tuples.

13. The verb phrase translation pattern constructing method using bilingual parallel corpus of claim 12, wherein the recognizing of the predicates and arguments includes:
- receiving the plurality of bilingual parallel corpus to recognize the predicate and argument of the source sentence using the syntax analysis result of the source sentence; and
- recognizing the predicate and argument of the target sentence corresponding to the recognized predicate and argument of the source sentence using the word alignment result.

14. The verb phrase translation pattern constructing method using bilingual parallel corpus of claim 12, wherein the extracting of the translation pattern candidate includes:
- extracting the same translation pattern candidate from different source sentence and target sentence; and
- calculating the occurrence frequency of the extracted same translation pattern candidate.

15. The verb phrase translation pattern constructing method using bilingual parallel corpus of claim 12, wherein the verifying of the extracted translation pattern candidate includes:
- comparing the occurrence frequency of the original sentence pattern for the extracted translation pattern candidate with a predetermined threshold; and
- removing the corresponding translation pattern candidate when the occurrence frequency is lower than the threshold.

16. The verb phrase translation pattern constructing method using bilingual parallel corpus of claim 12, wherein if the occurrence frequency of the translated part pattern is lower than a predetermined threshold, the verifying of the extracted translation pattern candidate includes:
- removing the corresponding translation pattern candidate from the extracted same translation pattern candidates.

17. The verb phrase translation pattern constructing method using bilingual parallel corpus of claim 12, wherein if among the extracted same translation pattern candidates, a translation pattern candidate has the occurrence frequency of the translated part pattern which is lower than a predetermined threshold, the verifying of the extracted translation pattern candidate includes:
- verifying the extracted same translation pattern candidates depending on whether the arguments of the translation pattern is plural and another translated part pattern including the translated part pattern is present.

18. The verb phrase translation pattern constructing method using bilingual parallel corpus of claim 12, wherein when the arguments of the generated first verb phrase translation pattern are generalized to a syntax phrase label, the generalizing of the generated first verb phrase translation pattern includes:
- confirming whether to be an effective verb phrase translation pattern to generalize the first verb phrase translation pattern and
- generating the second verb phrase translation pattern.

19. The verb phrase translation pattern constructing method using bilingual parallel corpus of claim 12, wherein the generalizing of the generated first verb phrase translation pattern includes:
- extracting tuples for all patterns that belong to the same group.

20. The verb phrase translation pattern constructing method using bilingual parallel corpus of claim 19, wherein the generalizing of the generated first verb phrase translation pattern includes:
- generalizing arguments other than an argument corresponding to a tuple having the highest frequency among the frequencies of the extracted tuples to generate the second verb phrase translation pattern.

21. The verb phrase translation pattern constructing method using bilingual parallel corpus of claim 19, wherein the generalizing of the generated first verb phrase translation pattern further includes:
- analyzing the translation ambiguity for the generated second verb phrase translation pattern to determine the second verb phrase translation pattern.

22. The verb phrase translation pattern constructing method using bilingual parallel corpus of claim 21, wherein the generalizing of the generated first verb phrase translation pattern includes:
- repeatedly performing the generalizing of the generated first verb phrase translation pattern for the determined second verb phrase translation pattern.

23. A non-transitory computer readable recording medium in which a program for causing a computer to execute a verb phrase translation pattern constructing method using bilingual parallel corpus is recorded, the method comprising:
- recognizing predicates and arguments of a source sentence and a target sentence using a syntax analysis result of the source sentence and a word alignment result between the source sentence and the target sentence from a plurality of bilingual parallel corpus;
- extracting a translation pattern candidate including an original sentence pattern and a translation pattern using the recognized predicates and arguments of the source sentence and the target sentence, and confirming the corresponding occurrence frequency;
- verifying the extracted translation pattern candidate using the occurrence frequency of the original sentence pattern or the translation pattern for the extracted translation pattern candidate, and generating a first verb phrase translation pattern according to the verification result; and generalizing the generated first verb phrase translation pattern to generate a second verb phrase translation pattern,
wherein the generalizing of the generated first verb phrase translation pattern comprises:
  making a group of patterns having the same predicate of the original sentence pattern among the first verb phrase translation patterns, and
  generating the second verb phrase translation pattern for all patterns that belong to the same group using tuples and the frequencies of the extracted tuples.

* * * * *